United States Patent
Oota et al.

(10) Patent No.: US 10,653,062 B2
(45) Date of Patent: May 19, 2020

(54) ELECTRIC POWER EQUIPMENT

(71) Applicant: HONDA MOTOR CO., LTD., Tokyo (JP)

(72) Inventors: Yoshitaka Oota, Wako (JP); Mai Kurihara, Wako (JP); Fumiya Isono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 15/819,584

(22) Filed: Nov. 21, 2017

(65) Prior Publication Data

US 2018/0146619 A1 May 31, 2018

(30) Foreign Application Priority Data

Nov. 30, 2016 (JP) ................. 2016-232325

(51) Int. Cl.
| | | |
|---|---|---|
| *A01D 34/69* | (2006.01) | |
| *A01D 34/68* | (2006.01) | |
| *A01D 69/00* | (2006.01) | |
| *A01B 33/02* | (2006.01) | |
| *A01D 34/78* | (2006.01) | |
| *A01D 34/82* | (2006.01) | |
| *A01D 69/02* | (2006.01) | |
| *B60L 15/20* | (2006.01) | |
| *A01D 101/00* | (2006.01) | |

(52) U.S. Cl.
CPC ............ *A01D 34/69* (2013.01); *A01B 33/028* (2013.01); *A01D 34/78* (2013.01); *A01D 34/824* (2013.01); *A01D 69/02* (2013.01); *B60L 15/20* (2013.01); *A01D 2034/6843* (2013.01); *A01D 2101/00* (2013.01); *B60L 2200/40* (2013.01); *Y02T 10/7258* (2013.01)

(58) Field of Classification Search
CPC ............ A01B 33/028; A01D 34/6806; A01D 34/006; A01D 34/824; A01D 34/001; A01D 34/52; A01D 34/68; A01D 34/69; A01D 69/02; A01D 34/78; B60L 15/20
USPC .... 56/10.5, 11.1, 10.7, 11.9, 17.5; 180/19.3, 180/65.6
See application file for complete search history.

(56) References Cited

U.S. PATENT DOCUMENTS

| | | | | |
|---|---|---|---|---|
| 4,835,949 A | * | 6/1989 | Seyerle ............. | A01D 34/6806 56/10.8 |
| 5,442,901 A | * | 8/1995 | Niemela ............ | A01D 34/6806 180/65.6 |
| 7,523,600 B2 | * | 4/2009 | Sasaoka ............... | A01D 34/824 180/19.3 |
| 9,060,463 B2 | * | 6/2015 | Yamaoka ............. | A01D 34/828 |

(Continued)

FOREIGN PATENT DOCUMENTS

| | | |
|---|---|---|
| EP | 2875709 A1 | 5/2015 |
| JP | H0255521 U | 4/1990 |

*Primary Examiner* — Robert E Pezzuto
(74) *Attorney, Agent, or Firm* — Armstrong Teasdale LLP

(57) ABSTRACT

In one aspect, electric power equipment includes: a horizontally extending left rotary shaft operably connected with a cutter blade operation lever; a horizontally extending right rotary shaft operably connected with a travel operation lever; and a cutter blade on/off switch and a potentiometer for setting a travel speed arranged at a laterally central position substantially between the left and right rotary shafts, such that the cutter blade on/off switch is operated by the left rotary shaft and the potentiometer is operated by the right rotary shaft.

7 Claims, 16 Drawing Sheets

(56) References Cited

U.S. PATENT DOCUMENTS

| | | | |
|---|---|---|---|
| 9,717,177 B2* | 8/2017 | Bian | A01D 34/824 |
| 9,968,031 B2* | 5/2018 | Bejcek | A01D 34/006 |
| 2011/0108335 A1* | 5/2011 | Levander | A01D 34/824 |
| | | | 180/19.3 |
| 2013/0046448 A1 | 2/2013 | Fan et al. | |
| 2014/0345416 A1* | 11/2014 | Kaskawitz | A01D 34/68 |
| | | | 74/523 |

* cited by examiner

ELECTRIC POWER EQUIPMENT

TECHNICAL FIELD

The present invention relates to electric power equipment, and particularly relates to self-propelled electric power equipment, such as electric lawn mowers, electric snow blowers, and electric tillers.

BACKGROUND OF THE INVENTION

Some electric lawn mowers has a main body provided with wheels, a mowing unit including a cutter blade, and an electric motor for driving the wheels and the cutter blade, and further has a handle including a pair of side rod members extends rearward from the main body (see JPH02-055521U, US2013/0046448A1, and EP2875709A1, for example). In such an electric lawn mower, when a power supply switch provided to the handle is turned on, the electric motor is activated to rotate the cutter blade, while the driving of the wheels is controlled by a switch or a potentiometer operated by an operation lever pivotably provided on the handle.

In the conventional electric lawn mower, the switch, potentiometer and the like are provided on a pivoting end of the operation lever that is pivotably supported by the handle, and as a result, the profile of the pivoting end of the operation lever is increased. This can deteriorate the operability of the operation lever by reducing an operation space and also is unfavorable from a design point of view.

SUMMARY OF THE INVENTION

In view of the above prior art problems, a primary object of the present invention is to provide electric power equipment which can prevent an increase in the profile of the pivoting end of the operation lever, to thereby prevent deterioration of operability and design of the operation lever.

Means to Accomplish the Task

To achieve the above object, one aspect of the present invention provides electric power equipment (1), comprising: a main body (2); a work unit (3) and wheels (4, 5) provided to the main body (2); a work unit electric motor (6) mounted on the main body (2) to drive the work unit (3); a travel electric motor (7) mounted on the main body (2) to drive the wheels (4, 5); a handle (20) including a pair of left and right side rod members (20A, 20B) extending rearward from the main body (2); a first rotary shaft (36) supported at a rear end of one of the side rod members (20A, 20B) so as to be rotatable about a horizontal axis; a second rotary shaft (38) supported at a rear end of the other of the side rod members (20A, 20B) so as to be rotatable about a horizontal axis aligned with the horizontal axis about which the first rotary shaft (36) is rotatable; a lever support collar member (48) fitted on an outer circumference of the first rotary shaft (36) so as to be rotatable around the first rotary shaft (36); a first operation lever (50) having one end (50A, 50C) connected with an outer end of the first rotary shaft (36) in a force transmitting relationship and another end (50B, 50D) connected with an outer end of the second rotary shaft (38) so as to be rotatable relative to the second rotary shaft (38) about a central axis of the second rotary shaft (38); a second operation lever (52) having one end (52A, 52C) connected with the lever support collar member (48) at a position displaced relative to a central axis of the first rotary shaft (36) so as to be rotatable with the lever support collar member (48) and another end connected with the outer end of the second rotary shaft (38) at a position displaced relative to the central axis of the second rotary shaft (38) in a force transmitting relationship; a first motor drive command unit (71) disposed at a laterally central position between the rear ends of the side rod members (20A, 20B) so as to be operable by an inner end of the first rotary shaft (36) to generate a command signal for controlling driving of one of the work unit electric motor (6) and the travel electric motor (7); a second motor drive command unit (82) disposed at a laterally central position between the rear ends of the side rod members (20A, 20B) so as to be operable by an inner end of the second rotary shaft (38) to generate a command signal for controlling driving of the other of the work unit electric motor (6) and the travel electric motor (7); and a controller (11) configured to control electric power supplied from a power source (12) to the work unit electric motor (6) and the travel electric motor (7) based on the signals from the first motor drive command unit (71) and the second motor drive command unit (82).

Owing to this arrangement, an increase in the profile of the pivoting ends of the first operation lever (50) and the second operation lever (52) can be prevented. Further, as the first and second motor drive command units (71, 82) are concentratedly arranged at the laterally central position, routing of a wire harness or the like for connecting these component parts with the controller (11) can be achieved easily, and this facilitates assembly and maintenance work.

Typically, the handle (20) includes a laterally extending handle grip (28) to be held by an operator, and each of the first operation lever (50) and the second operation lever (52) includes a laterally extending lever grip (50G, 52G), each lever grip (50G, 52G) being pivotable between an on position where the lever grip (50G, 52G) is positioned in the vicinity of the handle grip (28) and an off position at which the lever grip (50G, 52G) is positioned more distant from the handle grip (28) than at the on position, and being urged by a spring (66, 68) toward the off position; the first motor drive command unit (71) generates a command signal to stop a corresponding one of the electric motors when the first operation lever (50) is at the off position, and generates a command signal to drive the corresponding electric motor when the first operation lever (50) is at the on position; the second motor drive command unit (82) generates a command signal to stop a corresponding one of the electric motors when the second operation lever (52) is at the off position, and generates a command signal to drive the corresponding electric motor when the second operation lever (52) is at the on position; and one of the first operation lever (50) and the second operation lever (52) that corresponds to the work unit electric motor (6) is configured to engage the other of the first operation lever (50) and the second operation lever (52) that corresponds to the travel electric motor (7) during a pivoting movement to the off position, and the other of the first operation lever (50) and the second operation lever (52) is configured to engage the one of the first operation lever (50) and the second operation lever (52) during a pivoting movement to the on position.

Owing to this arrangement, it is prevented that only the travel electric motor (7) is turned on, and it is ensured that the travel electric motor (7) is allowed to be turned on only when the work unit electric motor (6) is in the on state.

In one preferred embodiment, the electric power equipment further includes an upper speed limit setting potentiometer (86) for variably setting an upper limit of a travel speed of the electric power equipment and an operation element (88) of the potentiometer, the potentiometer and the operation element thereof being located at a laterally central position between the rear ends of the side rod members (20A, 20B).

Owing to this arrangement, an operator can easily access and operate the operation element (88) of the potentiometer (86) to variably set the upper limit of the travel speed of the electric power equipment.

Also preferably, the electric power equipment further includes an upper speed limit selector switch (74, 76) for selectively setting an upper limit rotational speed of the work unit electric motor (6) and an operation element (78, 80) of the selector switch, the selector switch and the operation element thereof being located at a laterally central position between the rear ends of the side rod members (20A, 20B).

Owing to this arrangement, an operator can easily access and operate the operation element (78, 80) of the selector switch (74, 76) to selectively set the upper limit speed of the work unit (3).

Preferably, the first operation lever (50) and the second operation lever (52) include respective laterally extending parts (A, 52G) configured to be grasped by an operator simultaneously, and the first operation lever (50) includes a part (B) configured to allow the operator to grasp only the first operation lever (50). To achieve such structure, the first operation lever (50) and the second operation lever (52) may have mutually different shapes as seen in front view.

Owing to this arrangement, an operator can easily drive the work unit electric motor (6) and the travel electric motor (7) simultaneously, while the operator is also allowed to drive only the work unit electric motor (6) without driving the travel electric motor (7).

In one preferred embodiment, the work unit may include a cutter blade (3) for mowing.

Owing to this arrangement, the electric power equipment can be embodied as an electric lawn mower.

Effect of the Invention

Thus, according to an aspect of the present invention, there is provided electric power equipment which can prevent an increase in the profile of the pivoting end of the operation lever, to thereby prevent deterioration of operability and design of the operation lever.

DESCRIPTION OF THE PREFERRED EMBODIMENT(S)

A walk behind electric lawn mower embodying electric power equipment according to the present invention will be described in the following with reference to FIGS. 1 to 14.

Figure 1:
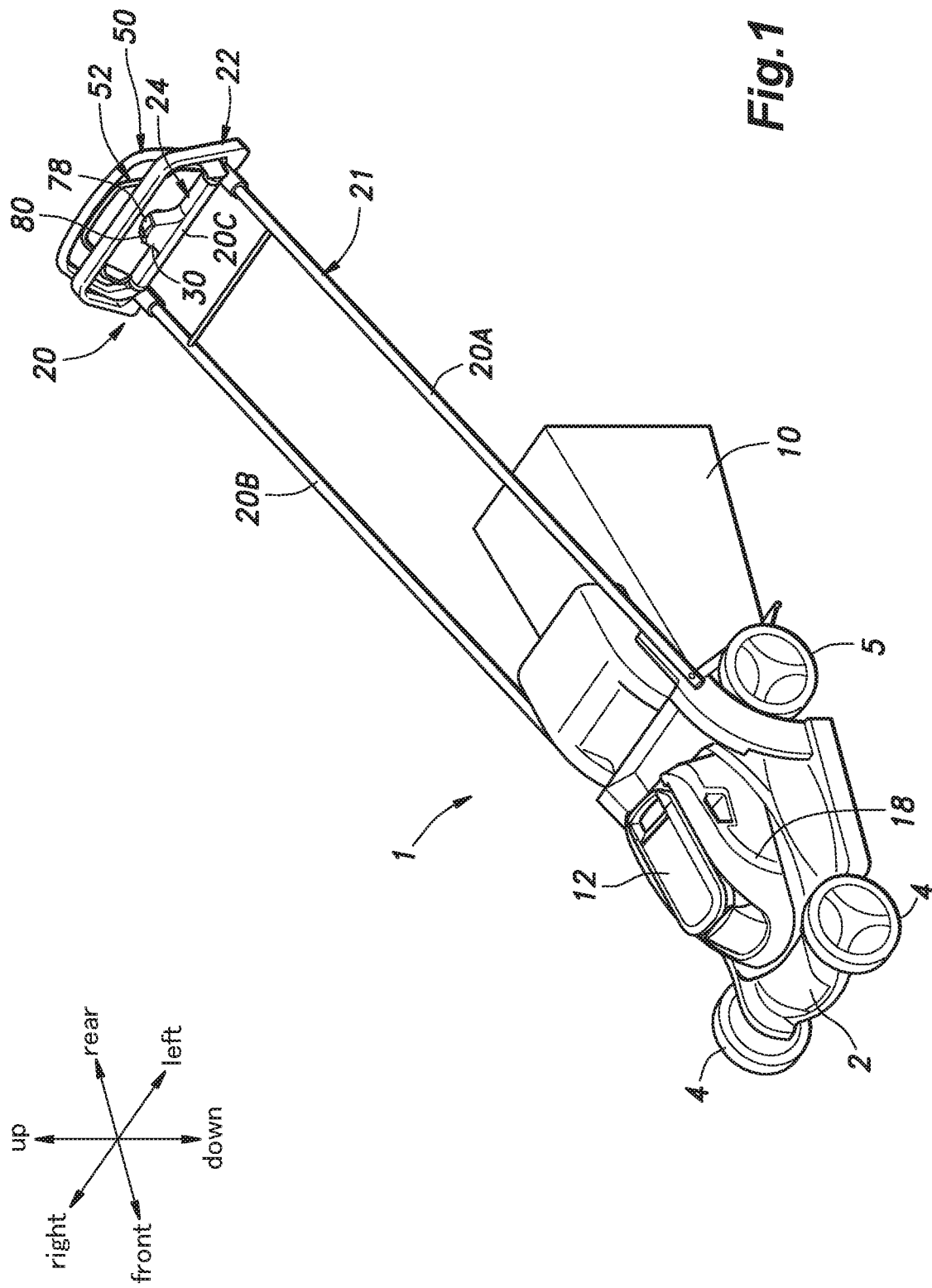
FIG. 1 is a perspective view of a walk behind electric lawn mower as one embodiment of electric power equipment according to the present invention.
Figure 2:
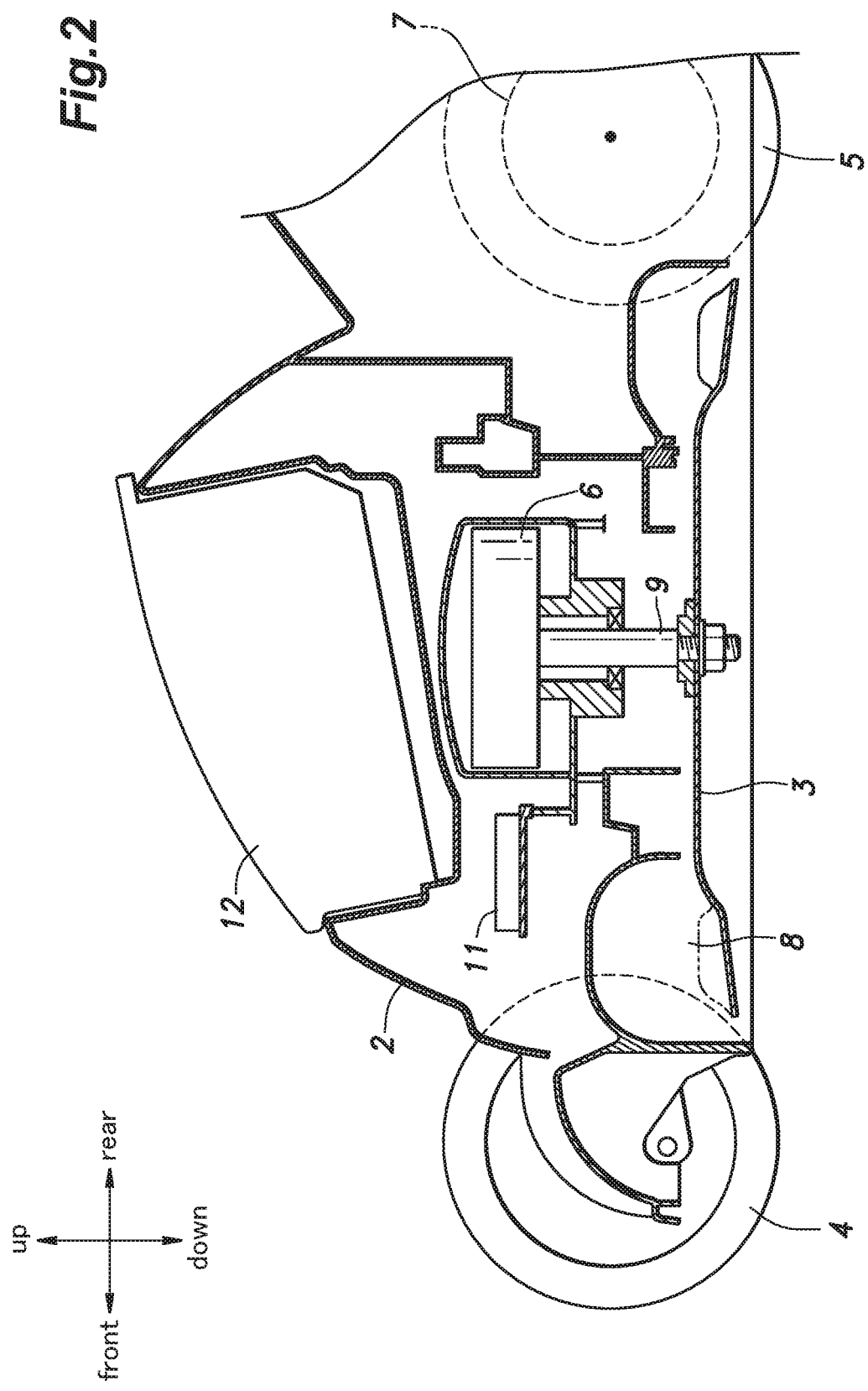
FIG. 2 is a vertical sectional view of a main body of the electric lawn mower.

As shown in FIGS. 1 and 2, the electric lawn mower 1 includes a main body 2, a cutter blade 3 provided in the main body 2, a pair of front wheels 4 and a pair of rear wheels 5 each supported rotatably on the main body 2, a cutter blade electric motor (work unit electric motor) 6 provided in the main body 2 to drive the cutter blade 3, and a travel electric motor 7 for driving the rear wheels 5.

The cutter blade 3 is disposed in a cutter blade chamber 8 formed in a bottom of the main body 2 so as to open downward such that the cutter blade 3 is rotatable in a substantially horizontal plane. The cutter blade 3 is secured to a lower end of an output shaft 9 of the cutter blade electric motor 6 and is driven by the output shaft 9 to rotate about a vertical axis. A grass bag 10 is provided to a rear end of the main body 2 to collect the grass cut by the cutter blade 3.

The main body 2 is provided with a controller 11 for controlling the cutter blade electric motor 6 and the travel electric motor 7. The main body 2 is further provided with a battery 12 serving as a power source that supplies electric power to the cutter blade electric motor 6, the travel electric motor 7, and the controller 11. It is to be noted that in another embodiment, an external power source connected with the electric lawn mower 1 via an electric code may be used instead of the battery 12 mounted on the main body 2 of the electric lawn mower 1.

A handle 20 is attached to the main body 2. The handle 20 includes a pair of left and right side rod members (side bars) 20A, 20B each having a base end secured to the main body 2 and extending from the main body 2 upward in the rearward direction, a cross member (cross bar) 20C extending laterally to connect free ends (rear ends) of the side rod members 20A, 20B to each other, and a loop-shaped handle grip member 22 attached to the side rod members 20A, 20B. In this embodiment, the side rod members 20A, 20B and the cross member 20C are formed integrally by bending a metal pipe 21 in a U-shape.

Figure 3:
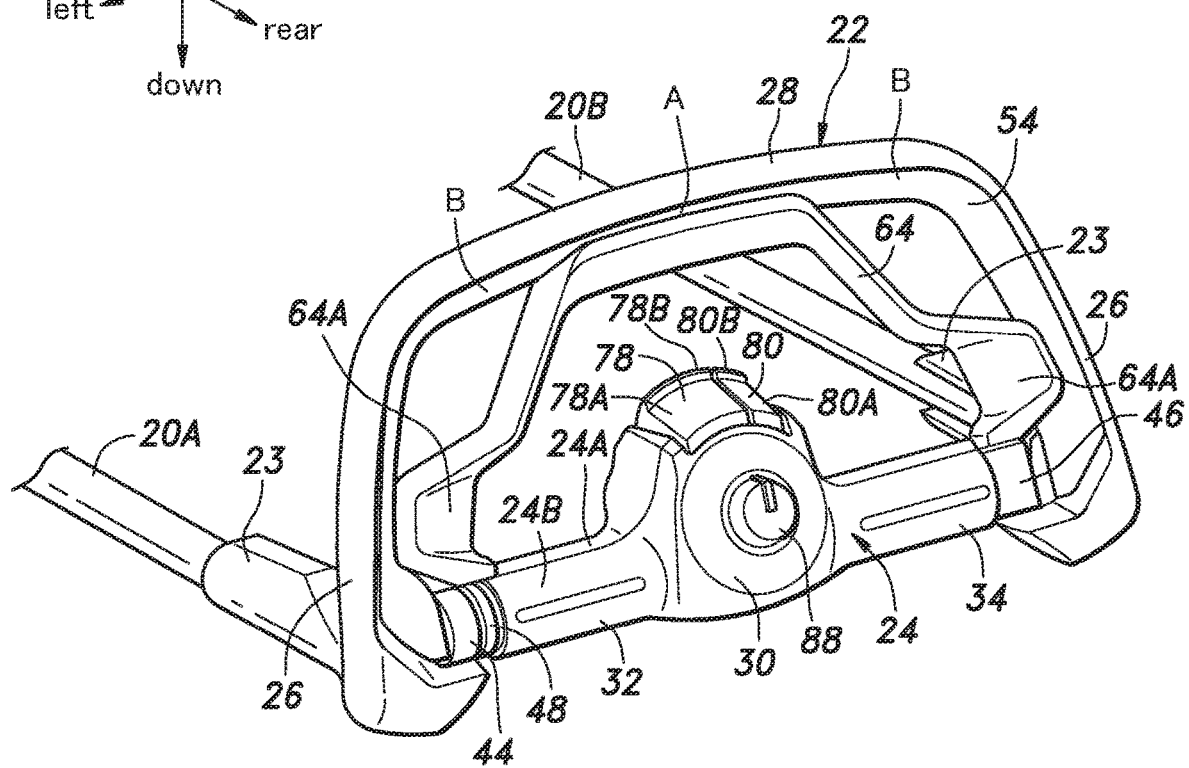
FIG. 3 is a front perspective view of an operating portion of the electric lawn mower.

The loop-shaped handle grip member 22 is formed by molding a resin. As shown in FIG. 3, the loop-shaped handle grip member 22 includes: a pair of left and right fixing parts 23 each having a C-shaped cross section and fitted on a part of a corresponding one of the side rod members 20A, 20B adjoining the free end (rear end) thereof so as to be secured to the corresponding one of the side rod members 20A, 20B; a lower bar 24 extending laterally behind the cross member 20C (see FIG. 1) and having left and right ends connected to the rear ends of the respective fixing parts 23; a pair of left and right side bars 26 respectively extending upright from the left and right ends of the lower bar 24; and an upper bar 28 extending laterally and having left and right ends connected to the upper ends of the respective side bars 26. The lower bar 24, the side bars 26, and the upper bar 28 jointly form a substantially rectangular loop shape as seen from the front, and the upper bar 28 serves as a handle grip to be held by the hands of an operator.

The lower bar 24 is formed of a base portion (front half) 24A integral with the side bars 26, and a cover member (rear half) 24B attached to a rear side of the base portion 24A, and includes an electric box (housing) 30 located at a laterally central position and a pair of left and right tubular portions 32, 34 extending leftward and rightward from the left and right sides of the electric box 30, respectively.

Figure 6:
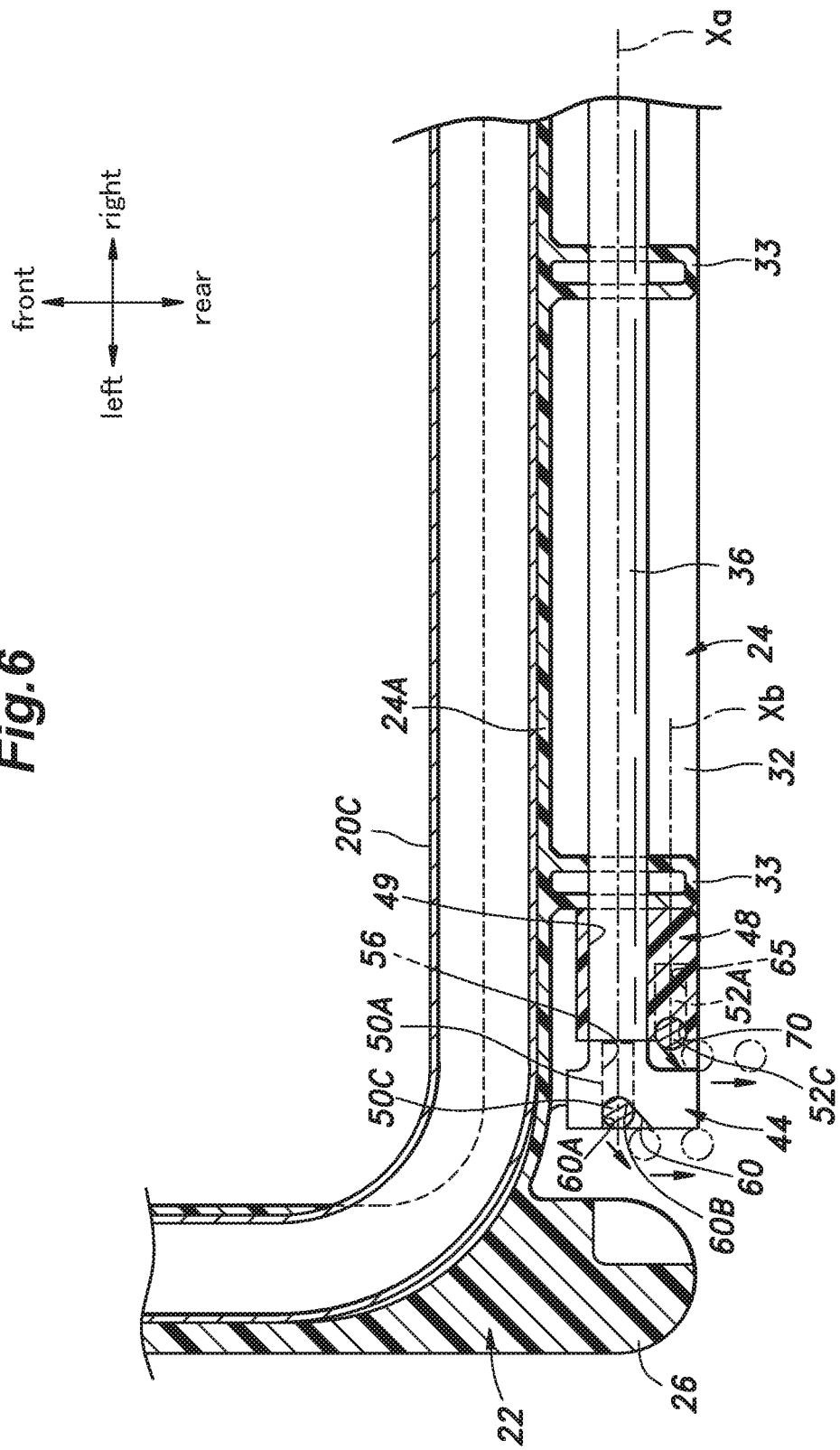
FIG. 6 is a sectional plan view of a left side portion of the operating portion of the electric lawn mower.
Figure 7:
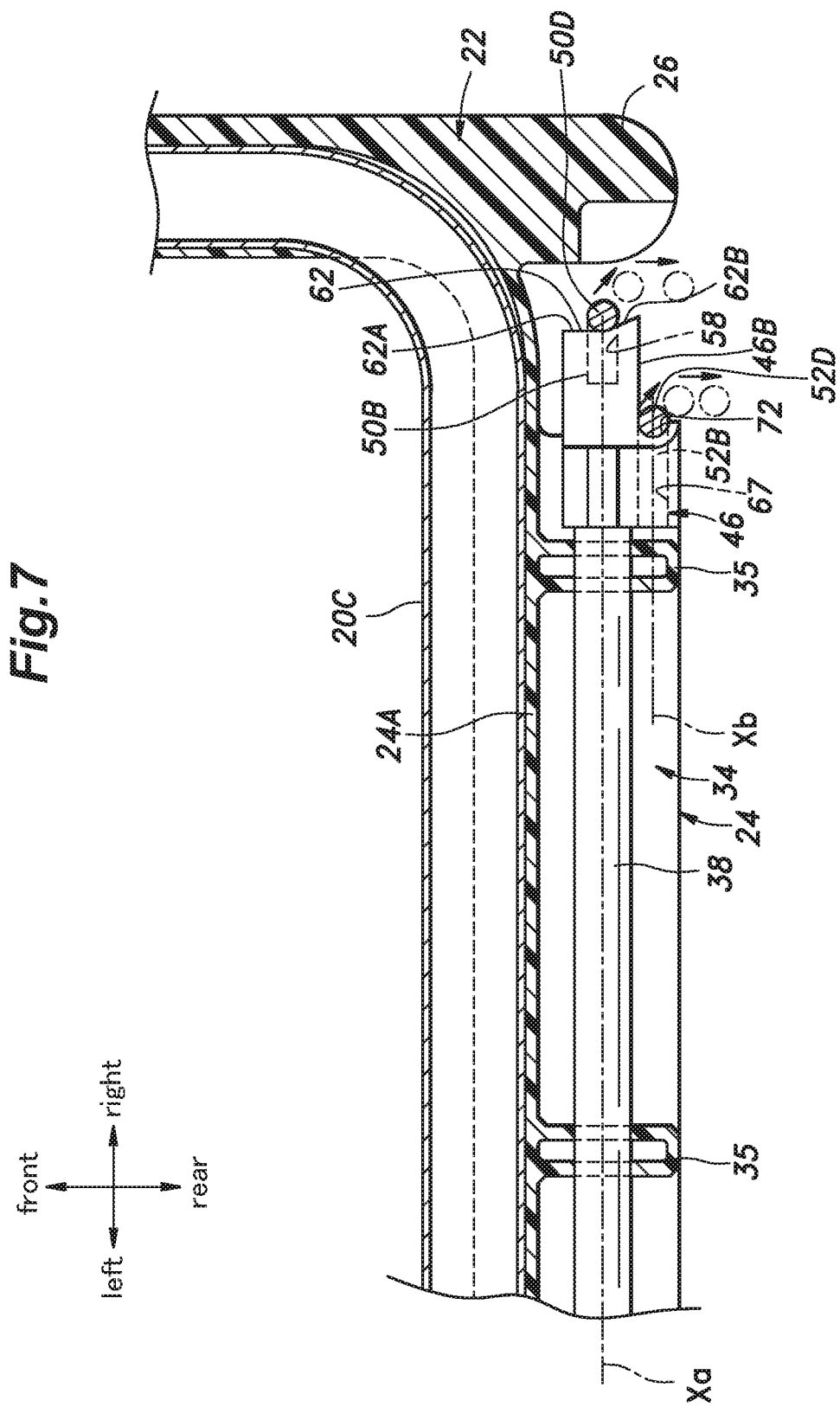
FIG. 7 is a sectional plan view of a right side portion of the operating portion of the electric lawn mower.

As shown in FIG. 6, the left tubular portion 32 includes brackets 33 that support a left rotary shaft (first rotary shaft) 36 extending laterally in the left tubular portion 32, such that the left rotary shaft 36 is rotatable about a horizontal axis. As shown in FIG. 7, the right tubular portion 34 includes brackets 35 that support a right rotary shaft (second rotary shaft) 38 extending laterally in the right tubular portion 34, such that the right rotary shaft 38 is rotatable about the horizontal axis same as that of the left rotary shaft 36. Namely, the tubular portions 32, 34 support the left rotary shaft 36 and the right rotary shaft 38 at the rear ends of the left and right side rod members 20A, 20B, respectively, so as to be independently rotatable about the same horizontal axis. In the following description, the central axis of the left rotary shaft 36 and the right rotary shaft 38 will be referred to as a first central axis Xa.

The left rotary shaft 36 is rotatable between a later-described first rotational position and a second rotational position separated from the first rotational position by a prescribed rotation angle, while the right rotary shaft 38 is rotatable between a later-described third rotational position and a fourth rotational position separated from the third rotational position by a prescribed rotation angle. In the present embodiment, the first rotational position and the third rotational position are the same, while the second rotational position and the fourth rotational position are the same.

The left rotary shaft 36 is formed by molding a resin, and is integrally provided with a left lever support block 44 at an outer end (left end) thereof. The right rotary shaft 38 is formed by molding a resin, and is integrally provided with a right lever support block 46 at an outer end (right end) thereof. A lever support collar member 48 having a through-hole 49 is fitted on an outer circumference of a part of the left rotary shaft 36 near the outer end thereof, such that the lever support collar member 48 is rotatable about the first central axis Xa.

Figure 4:
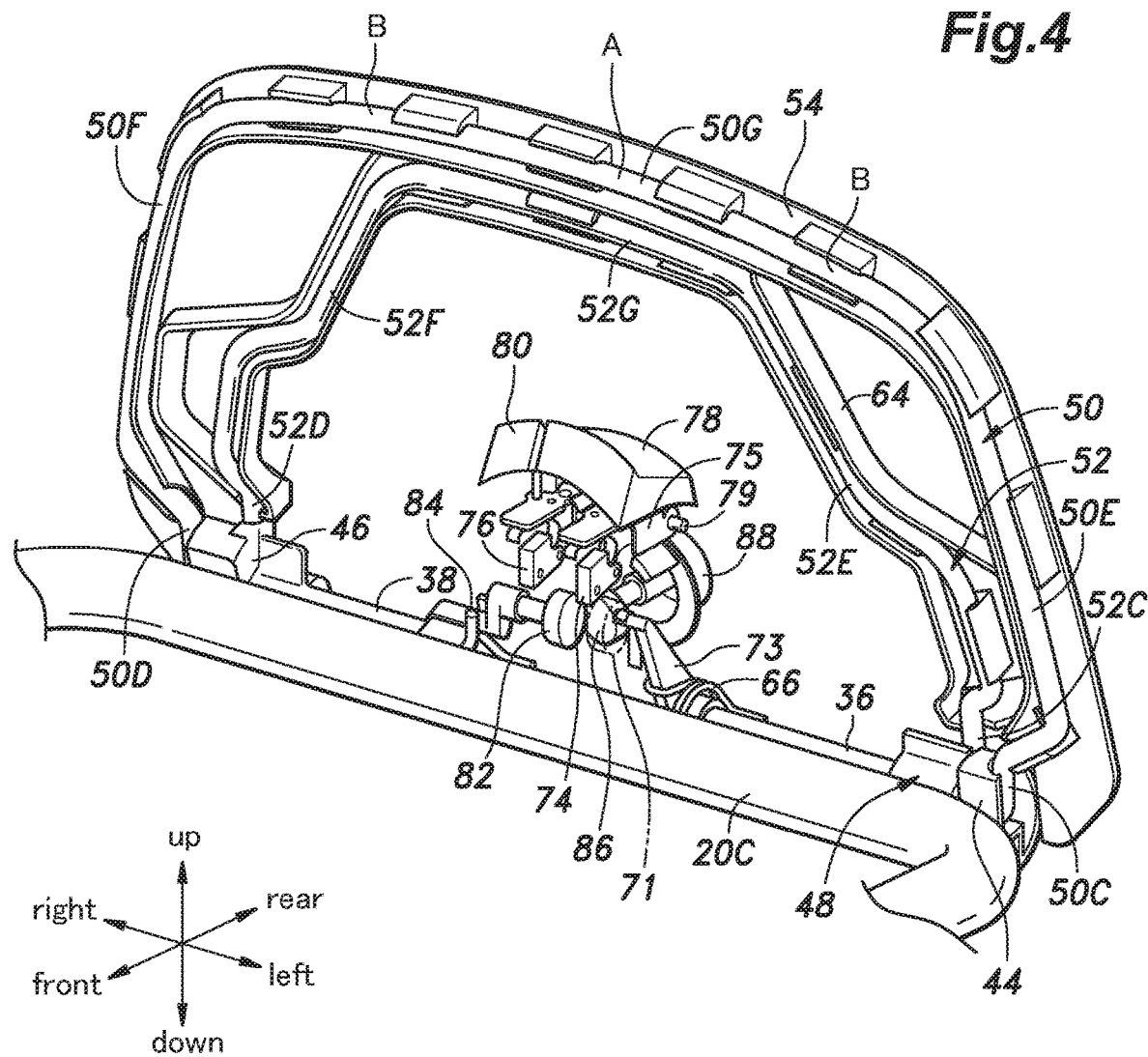
FIG. 4 is a rear perspective view of the operating portion of the electric lawn mower, with grip forming member removed.

As shown in FIGS. 1 and 4, an operating portion of the electric lawn mower 1 includes a cutter blade operation lever (first operation lever) 50 and a travel operation lever (second operation lever) 52, each having a substantially U-shape. The left and right end portions of the cutter blade operation lever 50 are connected with the left lever support block 44 and the right lever support block 46, respectively, while the left and right end portions of the travel operation lever 52 are connected with the lever support collar member 48 and the right lever support block 46, respectively.

In the following, detailed explanation will be made of how the cutter blade operation lever 50 and the travel operation lever 52 are connected with the left lever support block 44, the right lever support block 46 and the lever support collar member 48, with reference to FIGS. 4 and 6 to 13.

Figure 8:
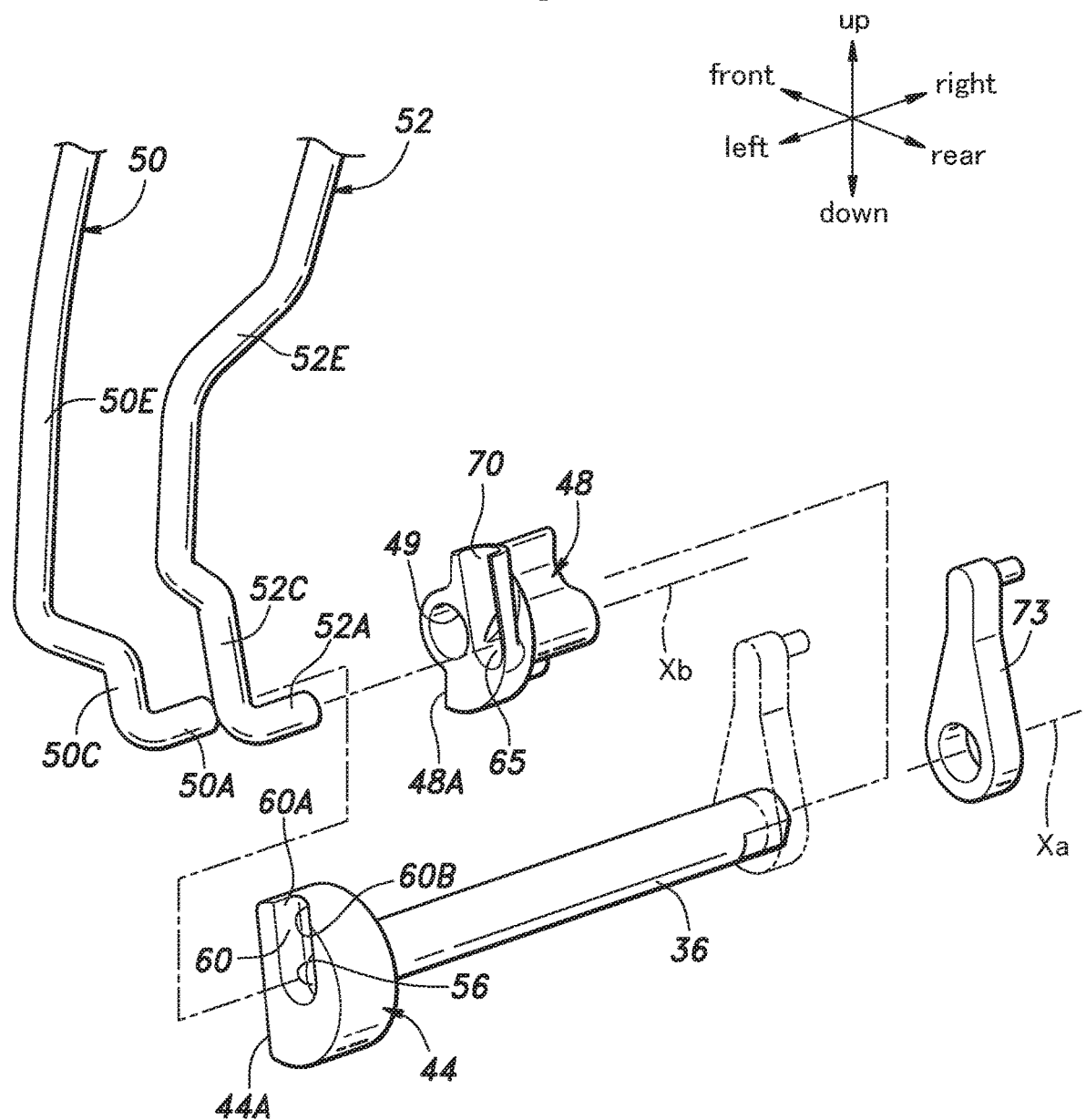
FIG. 8 is an exploded perspective view showing an engagement structure between a left rotary shaft and each of two operation levers of the electric lawn mower.
Figure 9:
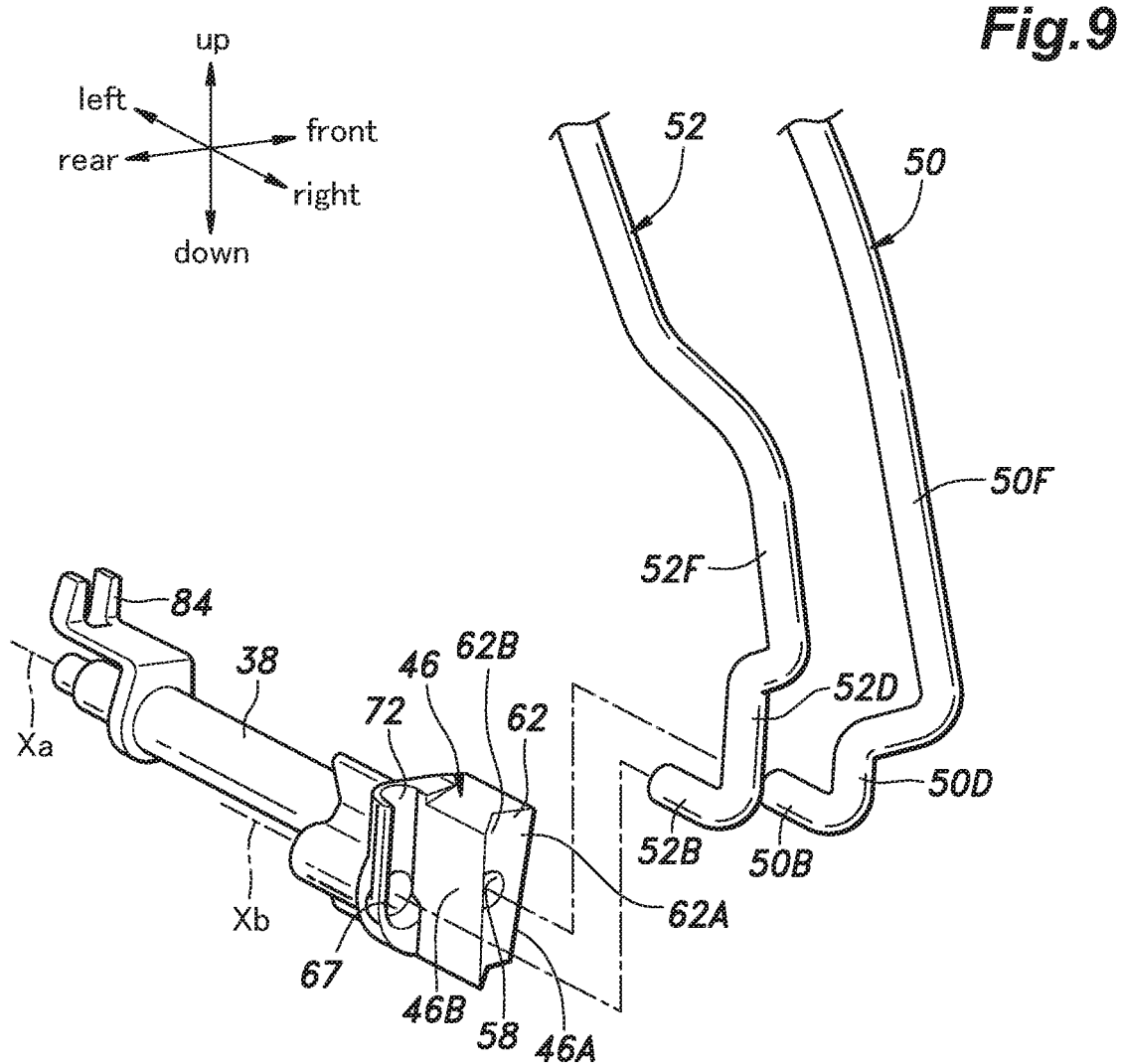
FIG. 9 is an exploded perspective view showing an engagement structure between a right rotary shaft and each operation lever of the electric lawn mower.
Figure 10:
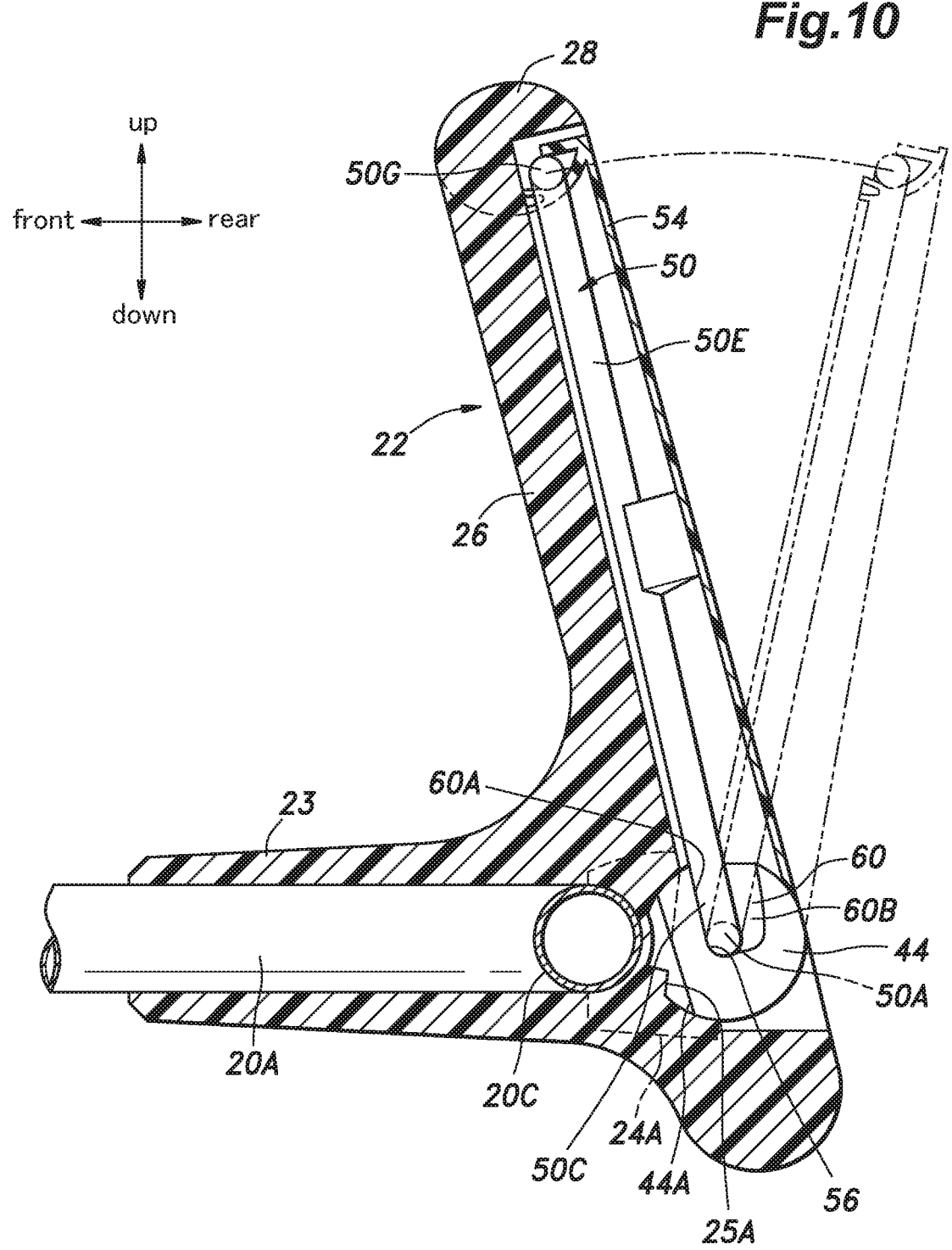
FIG. 10 is a vertical sectional view of a left side portion of a cutter blade operation lever of the electric lawn mower.
Figure 12:
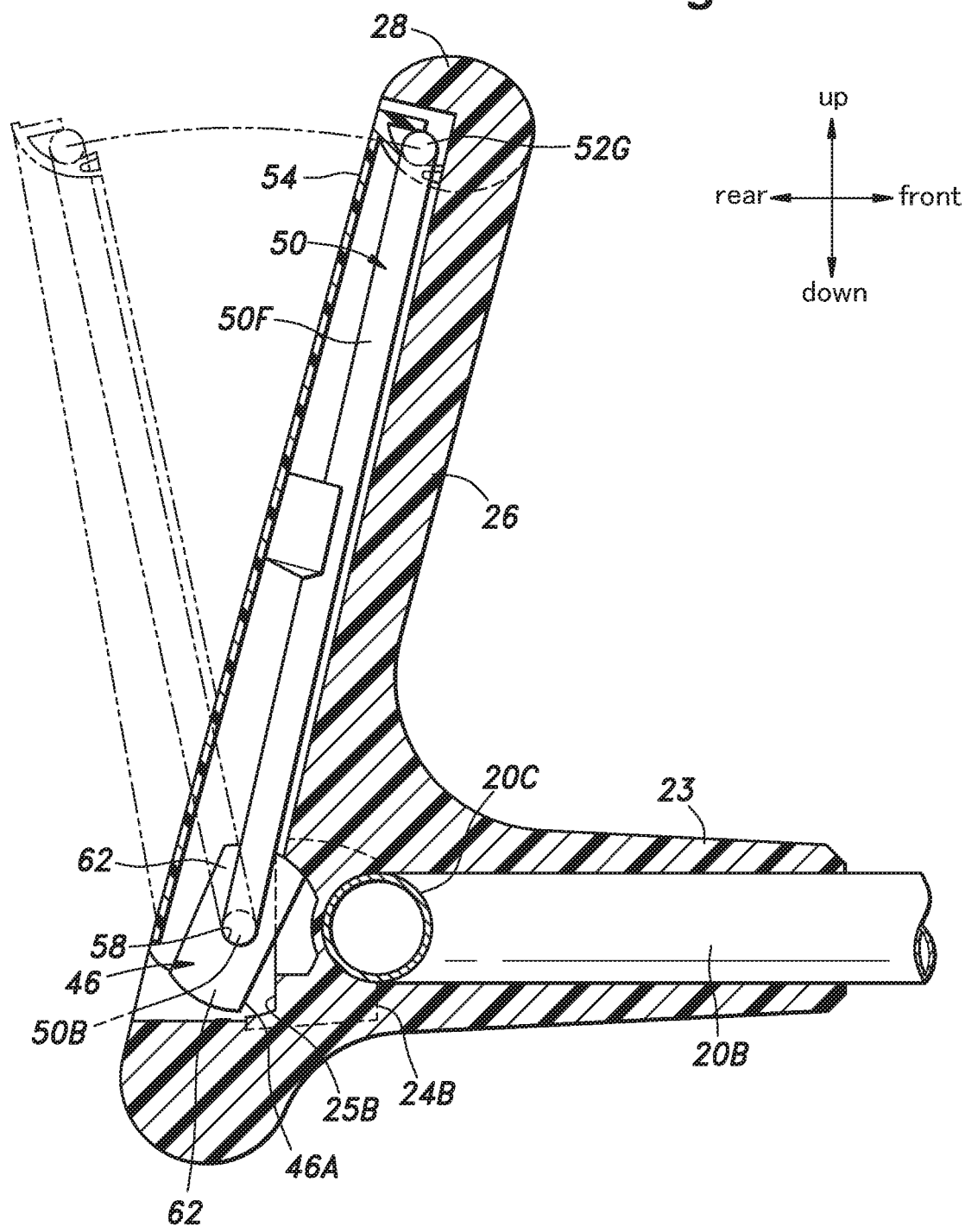
FIG. 12 is a vertical sectional view of a right side portion of the cutter blade operation lever of the electric lawn mower.

The cutter blade operation lever 50 is formed by bending a metal rod having a circular cross section. As is best shown in FIGS. 4, 8 and 9, the cutter blade operation lever 50 integrally includes: left and right shaft portions 50A, 50B extending along the first central axis Xa at the respective ends of the cutter blade operation lever 50; left and right engagement legs 50C, 50D bent upward from the outer ends of the respective shaft portions 50A, 50B at a right angle so as to extend radially outward (upward) with respect to the first central axis Xa; left and right side portions 50E, 5° F. extending further upward from the upper ends of the respective engagement legs 50C, 50D; and a lever grip 50G extending laterally behind the upper bar 28 and connected to the upper ends of the side portions 50E, 50F, whereby the cutter blade operation lever 50 has a substantially U-shape as seen from the front, and is given a spring property (resiliency) in a direction of movement of the engagement legs 50C, 50D toward and away from each other. As shown in FIGS. 4, 10 and 12, an exterior cover 54 made by molding a resin is fitted to the rear side of the cutter blade operation lever 50 to cover the portions other than the shaft portions 50A, 50B.

As shown in FIGS. 8 and 9, the left lever support block 44 and the right lever support block 46 are respectively provided with round bearing holes 56, 58 on outer sides thereof such that shaft portions 50A, 50B of cutter blade operation lever 50 are received in the bearing holes 56, 58 so as to be rotatable about the first central axis Xa. The outer end surface of the left lever support block 44, namely, the end surface in which the bearing hole 56 is opened, is formed with an engagement recess (first engagement recess) 60 that extends from the bearing hole 56 radially outward (upward) with respect to the left rotary shaft 36 to engage the engagement leg (first rod) 50C. The outer end surface of the right lever support block 46 is formed with a cam surface 62 against which the engagement leg 50D abuts. The engagement leg 50C is pressed against the bottom of the engagement recess 60 and the engagement leg 50D is pressed against the cam surface 62 by the spring force of the cutter blade operation lever 50 itself.

With the shaft portions 50A, 50B received in the corresponding bearing holes 56, 58, the cutter blade operation lever 50 is rotatable relative to the left rotary shaft 36 and the right rotary shaft 38 about the first central axis Xa. Further, in a state where the engagement leg 50C is engaged with the engagement recess 60 by the spring force of the cutter blade operation lever 50 itself, the cutter blade operation lever 50 is connected with the left rotary shaft 36 in a force transmitting relationship.

With the engagement leg 50C engaged with the engagement recess 60, namely, in a state where the cutter blade operation lever 50 and the left rotary shaft 36 are connected with each other in a force transmitting relationship, the cutter blade operation lever 50 is rotatable about the first central axis Xa with the shaft portions 50A, 50B serving as fulcrums between an on position where the cutter blade operation lever 50 is tilted forward (rotated counterclockwise in FIG. 10) and the lever grip 50G is positioned close to the upper bar 28 as shown by solid lines in FIG. 10 and an off position where the cutter blade operation lever 50 is tilted rearward (rotated clockwise in FIG. 10) and the lever grip 50G is positioned distant from the upper bar 28 as shown by imaginary lines in FIG. 10.

The rotational position of the left rotary shaft 36 when the cutter blade operation lever 50 is at the off position is the first rotational position, and the rotational position of the left rotary shaft 36 when the cutter blade operation lever 50 is at the on position is the second rotational position. As shown in FIG. 10, the first rotational position of the left rotary shaft 36 (and hence, the off position of the cutter blade operation lever 50) is determined by abutment of a stopper surface 44A formed in the left lever support block 44 against a stopper surface 25A formed in the base portion 24A and abutment of the cutter blade operation lever 50 against the travel operation lever 52 placed at the off position, while the on position of the cutter blade operation lever 50 is determined by abutment of the exterior cover 54 against the loop-shaped handle grip member 22.

Figure 5:
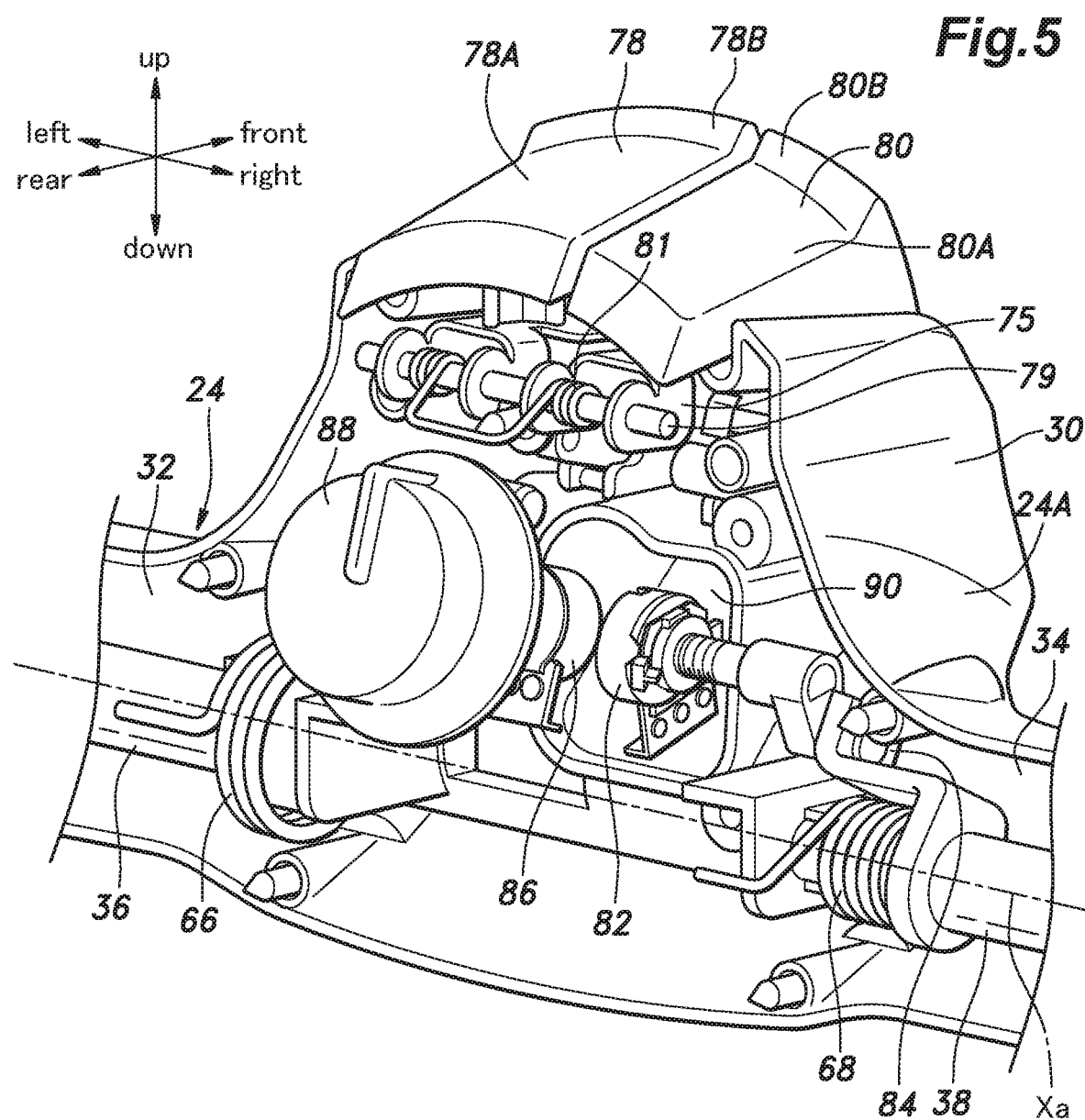
FIG. 5 is an enlarged rear perspective view of an electric box of the operating portion of the electric lawn mower, with a cover removed.

As shown in FIG. 5, a torsion coil spring 66 is provided between the left rotary shaft 36 and the lower bar 24 to urge the left rotary shaft 36 clockwise as seen in FIG. 10. Thereby, the cutter blade operation lever 50 is urged together with the left rotary shaft 36 by the torsion coil spring 66 toward the off position, so that when no external force is applied, the cutter blade operation lever 50 is placed at the off position.

As shown in FIG. 6, the engagement recess 60 is defined by a front barrier surface 60A and a rear inclined surface 60B. Thereby, even if a large external force is applied to the cutter blade operation lever 50 in a forward tilting direction, abutment of the front barrier surface 60A against the engagement leg 50C prevents the engagement leg 50C from getting out of the engagement recess 60. In a case where an external force is applied to the cutter blade operation lever 50 in a rearward tilting direction, if the external force is smaller than a prescribed value smaller than the urging force of the torsion coil spring 66, the engagement leg 50C is retained in the engagement recess 60, but if the rearward external force acting on the cutter blade operation lever 50 becomes larger than or equal to the prescribed value, the cutter blade operation lever 50 itself undergoes resilient deformation and the engagement leg 50C slides along the inclined surface 60B such that the engagement leg 50C gets out of the engagement recess 60, and the cutter blade operation lever 50 tilts rearward beyond the off position with an increasing reaction force resulting from an increase in the resilient deformation (and hence the spring force) of the cutter blade operation lever 50 due to the sliding of the engagement leg 50C along the inclined surface 60B.

Thereby, a first releasable engagement mechanism (torque limiter) is constituted, such that so long as an external force in the rearward tilting direction that is larger than or equal to the prescribed value does not act on the cutter blade operation lever 50, the cutter blade operation lever 50 and the left rotary shaft 36 are engaged with each other in a force transmitting relationship, and if an excessive external force in the rearward tilting direction that is larger than the prescribed value, namely, larger than the urging force of the torsion coil spring 66, acts on the cutter blade operation lever 50, the force transmitting engagement between the cutter blade operation lever 50 and the left rotary shaft 36 is released, whereby the cutter blade operation lever 50 can be rotated relative to the left rotary shaft 36 in the rearward tilting direction. The first releasable engagement mechanism utilizes the spring force of the cutter blade operation lever 50 itself and does not require a separate spring member, and thus, the structure thereof can be simplified.

As shown in FIG. 7, the cam surface 62 is defined by a front orthogonal plane 62A orthogonally intersecting the first central axis Xa and a rear inclined surface 62B that is inclined outward in the rearward direction. When the cutter blade operation lever 50 is rotated between the off position and the on position, the engagement leg 50D slidably contacts the front orthogonal plane 62A, whereby the cutter blade operation lever 50 can rotate freely relative to the right rotary shaft 38, and hence, the right rotary shaft 38 does not rotate together with the cutter blade operation lever 50. In a case where an external force acting on the cutter blade operation lever 50 in the rearward tilting direction becomes larger than or equal to a prescribed value, the side portion 50F undergoes resilient deformation and the engagement leg 50D rides on and slides along the rear inclined surface 62B, whereby the cutter blade operation lever 50 tilts rearward beyond the off position with an increasing reaction force resulting from an increase in the resilient deformation (and hence the spring force) of the cutter blade operation lever 50 due to the sliding of the engagement leg 50D along the inclined surface 62B.

Figure 11:
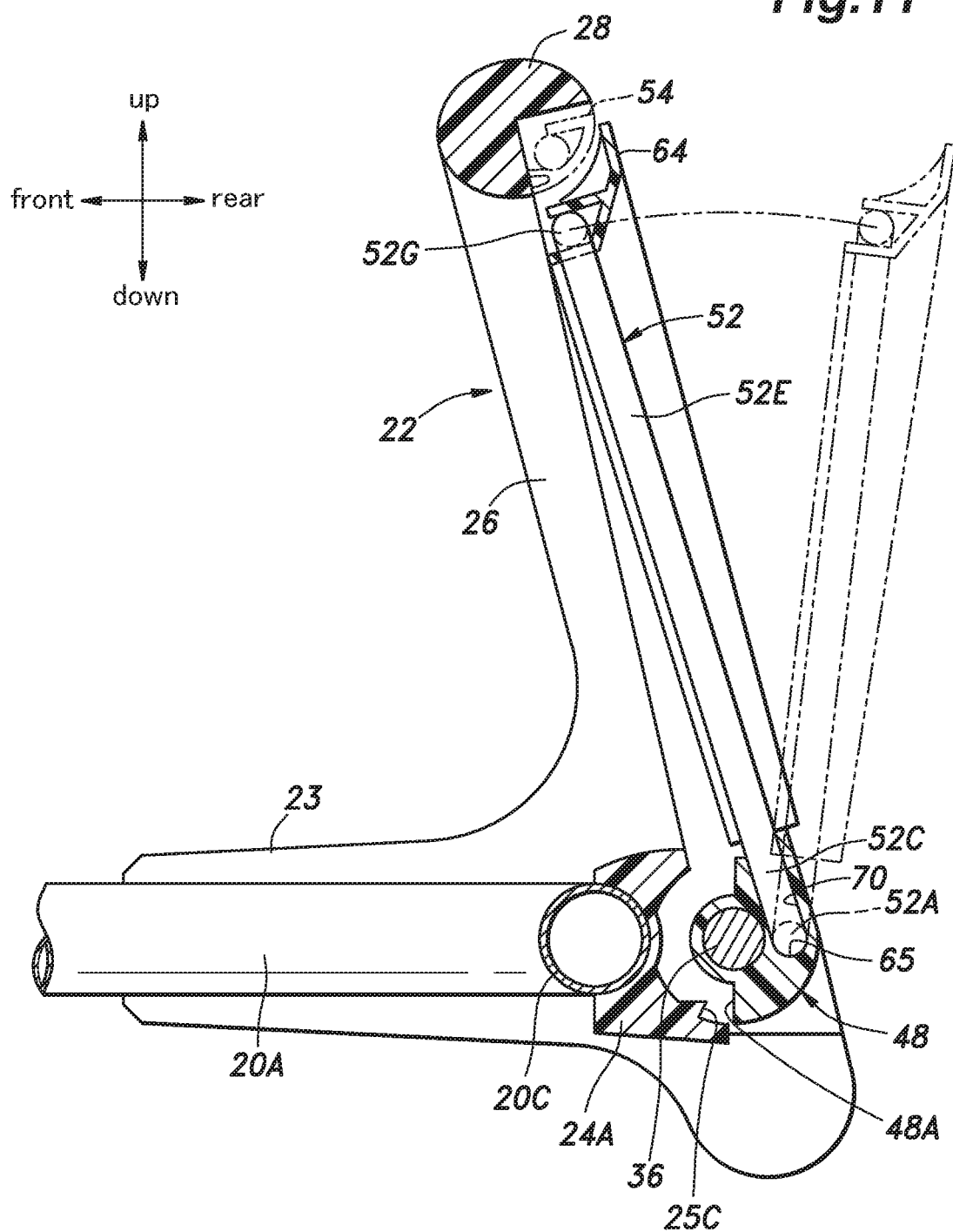
FIG. 11 is a vertical sectional view of a left side portion of a travel operation lever of the electric lawn mower.
Figure 13:
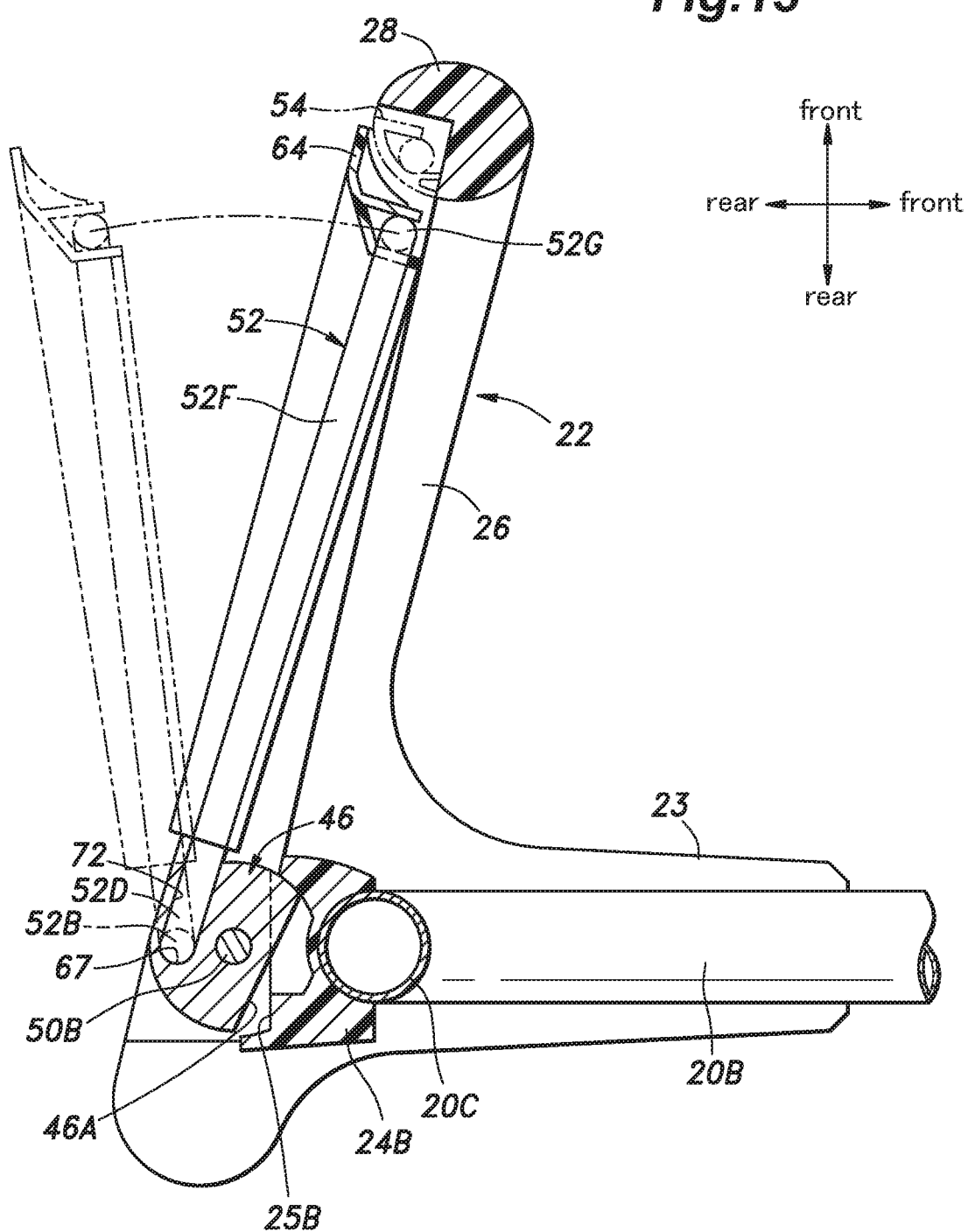
FIG. 13 is a vertical sectional view of a right side portion of the travel operation lever of the electric lawn mower.

The travel operation lever 52 is formed by bending a metal rod having a circular cross section. As is best shown in FIGS. 4, 8 and 9, the travel operation lever 52 integrally includes: left and right shaft portions 52A, 52B extending along a second central axis Xb, which is offset from and extends in parallel to the first central axis Xa, at the respective ends of the travel operation lever 52; left and right engagement legs 52C, 52D bent upward from the outer ends of the respective shaft portions 52A, 52B at a right angle so as to extend radially outward (upward) with respect to the second central axis Xb; left and right side portions 52E, 52F extending further upward from the upper ends of the engagement legs 52C, 52D; and a lever grip 52G extending laterally behind the upper bar 28 and connected to the upper ends of the side portions 52E, 52F, whereby the travel operation lever 52 has a substantially U-shape as seen from the front, and is given a spring property (resiliency) in a direction of movement of the engagement legs 52C, 52D toward and away from each other. As shown in FIGS. 4, 11 and 13, an exterior cover 64 made by molding a resin is fitted to the rear side of the travel operation lever 52 to cover the portions other than the shaft portions 52A, 52B.

As shown in FIGS. 8 and 9, the lever support collar member 48 and the right lever support block 46 are respectively provided with round bearing holes 65, 67 on outer sides thereof such that the shaft portions 52A, 52B of the travel operation lever 52 are received in the bearing holes 65, 67 so as to be rotatable about the second central axis Xb. The bearing hole 67 of the right lever support block 46 is provided at a position offset rearward and inward with respect to the other bearing hole 58 provided in the right lever support block 46.

The outer end surface of the lever support collar member 48, namely, the end surface in which the bearing hole 65 is opened, is formed with a substantially semi-circular groove-shaped engagement recess 70 that extends from the bearing hole 65 radially outward (upward) with respect to the left rotary shaft 36 to engage the engagement leg 52C. The right lever support block 46 is formed with a substantially semi-circular groove-shaped engagement recess (second engagement recess) 72 that extends from the open end of the bearing hole 67 radially outward (upward) with respect to the right rotary shaft 38 to engage the engagement leg (second rod) 52D. The engagement legs 52C, 52D are pressed against the bottoms of the engagement recesses 70, 72, respectively, by the spring force of the travel operation lever 52 itself.

With the shaft portions 52A, 52B received in the corresponding bearing holes 65, 67, the travel operation lever 52 is rotatable relative to the left rotary shaft 36 and the right rotary shaft 38 about the second central axis Xb together with the right lever support block 46. Further, with the engagement leg 52D received with the engagement recess 72, the travel operation lever 52 is connected with the right rotary shaft 38 in a force transmitting relationship.

With the engagement legs 52C, 52D engaged with the corresponding engagement recesses 70, 72, namely, in a state where the travel operation lever 52 and the right rotary shaft 38 are engaged with each other in a force transmitting relationship, the travel operation lever 52 is rotatable about the second central axis Xb with the shaft portions 52A, 52B serving as fulcrums between an on position where the travel operation lever 52 is tilted forward (counterclockwise in FIG. 11) and the lever grip 52G is positioned close to the upper bar 28 as shown by solid lines in FIG. 11 and an off position where the travel operation lever 52 is tilted rearward (clockwise in FIG. 11) and the lever grip 52G is positioned distant from the upper bar 28 as shown by imaginary lines in FIG. 11.

The rotational position of the right rotary shaft 38 when the travel operation lever 52 is at the off position is the third rotational position, and the rotational position of the right rotary shaft 38 when the travel operation lever 52 is at the on position is the fourth rotational position. As shown in FIGS. 11 and 13, the third rotational position of the right rotary shaft 38 (and hence, the off position of the travel operation lever 52) is determined by abutment of stopper surfaces 46A, 48A respectively formed in the right lever support block 46 and the lever support collar member 48 against corresponding stopper surfaces 25B, 25C formed in the base portion 24A, while the on position of the travel operation lever 52 is determined by abutment of the exterior cover 64 against the exterior cover 54 of the cutter blade operation lever 50 placed at the on position.

As shown in FIG. 5, a torsion coil spring 68 is provided between the right rotary shaft 38 and the lower bar 24 to urge the right rotary shaft 38 clockwise as seen in FIG. 10. Thereby, the travel operation lever 52 is urged together with the right rotary shaft 38 by the torsion coil spring 68 toward the off position, so that when no external force is applied, the travel operation lever 52 is placed at the off position.

As seen in FIG. 6, the left rotary shaft 36 is disposed in front of the open end of the engagement recess 70, and as shown in FIGS. 7 and 9, a barrier surface 46B formed by a rear surface of the right lever support block 46 is disposed in front of the open end of the engagement recess 72. Thereby, even if a large external force is applied to the travel operation lever 52 in a forward tilting direction, abutment of the left rotary shaft 36 against the engagement leg 52C and abutment of the barrier surface 46B against the engagement leg 52D prevent the engagement legs 52C, 52D from getting out of the engagement recesses 70, 72, respectively. In a case where an external force is applied to the travel operation lever 52 in a rearward tilting direction, if the external force is smaller than a prescribed value smaller than the urging force of the torsion coil spring 68, the engagement legs 52C, 52D do not get out of the engagement recesses 70, 72, but if the rearward external force acting on the travel operation lever 52 becomes larger than or equal to the prescribed value, the side portions 50E, 5° F. undergo resilient deformation and the engagement legs 52C, 52D get out of the engagement recesses 70, 72, such that the travel operation lever 52 tilts rearward beyond the off position with an increasing reaction force.

Thereby, a second releasable engagement mechanism (torque limiter) is constituted, such that so long as an external force in the rearward tilting direction that is larger than or equal to the prescribed value does not act on the travel operation lever 52, the travel operation lever 52 and the right rotary shaft 38 are engaged with each other in a force transmitting relationship, and if an excessive external force in the rearward tilting direction that is larger than the prescribed value, namely, larger than the urging force of the torsion coil spring 68, acts on the travel operation lever 52, the force transmitting engagement between the travel operation lever 52 and the right rotary shaft 38 is released, whereby the travel operation lever 52 can be rotated relative to the right rotary shaft 38 in the rearward tilting direction. The second releasable engagement mechanism utilizes the spring force of the travel operation lever 52 itself and does not require a separate spring member, and thus, the structure thereof can be simplified.

As seen from the front, the cutter blade operation lever 50 has a relatively simple U-shape with the linear side portions 50E, 50F, whereas the side portions 52E, 52F of the travel operation lever 52 each have a stepped (convex) portion. As a result, the lever grip 50G of the cutter blade operation lever 50 overlaps the lever grip 52G of the travel operation lever 52 only over a laterally central section A (see FIG. 4). This allows the operator to grasp the lever grip 50G of the cutter blade operation lever 50 and the lever grip 52G of the travel operation lever 52 simultaneously at the central section A of the lever grip 50G of the cutter blade operation lever 50, and to grasp only the lever grip 50G of the cutter blade operation lever 50 at laterally side sections B (see FIG. 4) of the lever grip 50G.

Thus, the cutter blade operation lever 50 and the travel operation lever 52 have different shapes as seen from the front so as to provide the central section A in which the both levers 50 and 52 can be easily grasped simultaneously and the side sections B in which only the travel operation lever 52 can be grasped easily.

As shown in FIGS. 3 and 4, the exterior cover 54 of the cutter blade operation lever 50 has an upper portion and left and right side portions overlapping the exterior cover 64 of the travel operation lever 52 from the front of the exterior cover 64. In other words, the exterior cover 64 of the travel operation lever 52 has an upper portion and left and right side portions overlapping the exterior cover 54 of the cutter blade operation lever 50 from behind the exterior cover 54. Thereby, the cutter blade operation lever 50 engages the travel operation lever 52 via the exterior covers 54, 64 when rotated toward the off position, while the travel operation lever 52 engages the cutter blade operation lever 50 via the exterior covers 54, 64 when rotated toward the on position. Therefore, the cutter blade operation lever 50 and the travel operation lever 52 can be placed at the on position simultaneously, but it is not possible to place only the travel operation lever 52 at the on position. Namely, it is prohibited to place only the travel operation lever 52 at the on position.

As shown in FIGS. 3 and 4, the exterior cover 64 includes ear-shaped operation parts 64A on inner sides of the left and right side portions thereof overlapping with the exterior cover 54 from behind. When the travel operation lever 52 and the cutter blade operation lever 50 are at the off position, if the operation parts 64A are pushed forward (toward the on position), the travel operation lever 52 is moved toward the on position together with the cutter blade operation lever 50 which is pushed by the upper travel operation lever 52.

As shown in FIGS. 4 and 5, a cutter blade on/off switch 71 is provided in a left part of the electric box 30. The cutter blade on/off switch 71 serves as a motor drive command unit for the cutter blade electric motor 6, and is operated by an operation arm 73 attached to the inner end of the left rotary shaft 36, such that the switch 71 is turned off when the cutter blade operation lever 50 is at the off position, and is turned on when the cutter blade operation lever 50 is moved out of the off position toward the on position. The cutter blade on/off switch 71 operated by the left rotary shaft 36 is an example of a first operated member for a work unit motor.

Provided in a central part of the electric box 30 are a high speed setting switch 74 and a low speed setting switch 76. The high speed setting switch 74 and the low speed setting switch 76 are momentary switches and, when operated, output on signals to the controller 11 which in accordance with the signals from the switches 74, 76, switches the rotational speed of the cutter blade 3 between two levels, namely, a high speed and a low speed.

The high speed setting switch 74 and the low speed setting switch 76 are operated by push buttons 78, 80 arranged next to each other in the lateral direction in an upper part of the electric box 30. The push buttons 78, 80 have rear portions pivotably supported by a horizontally extending pivot shaft 79 on a button supporting member 75 fixed to the electric box 30, and is urged upward by a spring force of a torsion coil spring 81. The upper surfaces (pressing surfaces) 78A, 80A of the push buttons 78, 80 are each exposed upward in an upper part of the electric box 30. The upper surfaces 78A, 80A each have a rectangular shape elongated in a fore-and-aft direction, and are disposed next to each other in the lateral direction. The lengths of the upper surfaces 78A, 80A in the fore-and-aft direction are the same, but the upper surface 78A has a lateral width larger than that of the upper surface 80A. Namely, the push button 78 of the high speed setting switch 74 has a larger pressing surface than the push button 80 of the low speed setting switch 76. Lands 78B, 80B are provided to protrude from front portions of the upper surfaces 78A, 80A, respectively, to prevent finger slipping.

In a right part of the electric box 30, a potentiometer 82 for setting the travel speed of the electric lawn mower 1 is provided. The potentiometer 82 serves as a motor drive command unit for the travel electric motor 7, and is operated by an operation arm 84 attached to the inner end of the right rotary shaft 38, such that the potentiometer 82 outputs a travel stop command when the travel operation lever 52 is at the off position, and outputs a travel command for increasing the travel speed along with an increase in the forward angle of the travel operation lever 52 with respect to the off position when the travel operation lever 52 is rotated forward from the off position. The potentiometer 82 operated by the right rotary shaft 38 is an example of a second operated member for a travel motor.

Further, a potentiometer 86 for setting a maximum travel speed is disposed in the central part of the electric box 30. The potentiometer 86 is operated by a dial 88 provided on a side of the electric box 30 facing the operator, and outputs a command such to set the maximum travel speed to a higher value as the dial 88 is turned more in the clockwise direction as seen from the operator.

A waterproof chamber 90 is defined in the electric box 30 by partition walls, and the potentiometers 82, 86 are placed in the waterproof chamber 90 to ensure high waterproofness.

The cutter blade on/off switch 71, the high speed setting switch 74, the low speed setting switch 76, and the potentiometers 82, 86 disposed in the electric box 30 are electrically connected with the controller 11 by a wire harness (not shown in the drawing) passed through the pipe forming the side rod members 20A, 20B and the cross member 20C.

Figure 14:
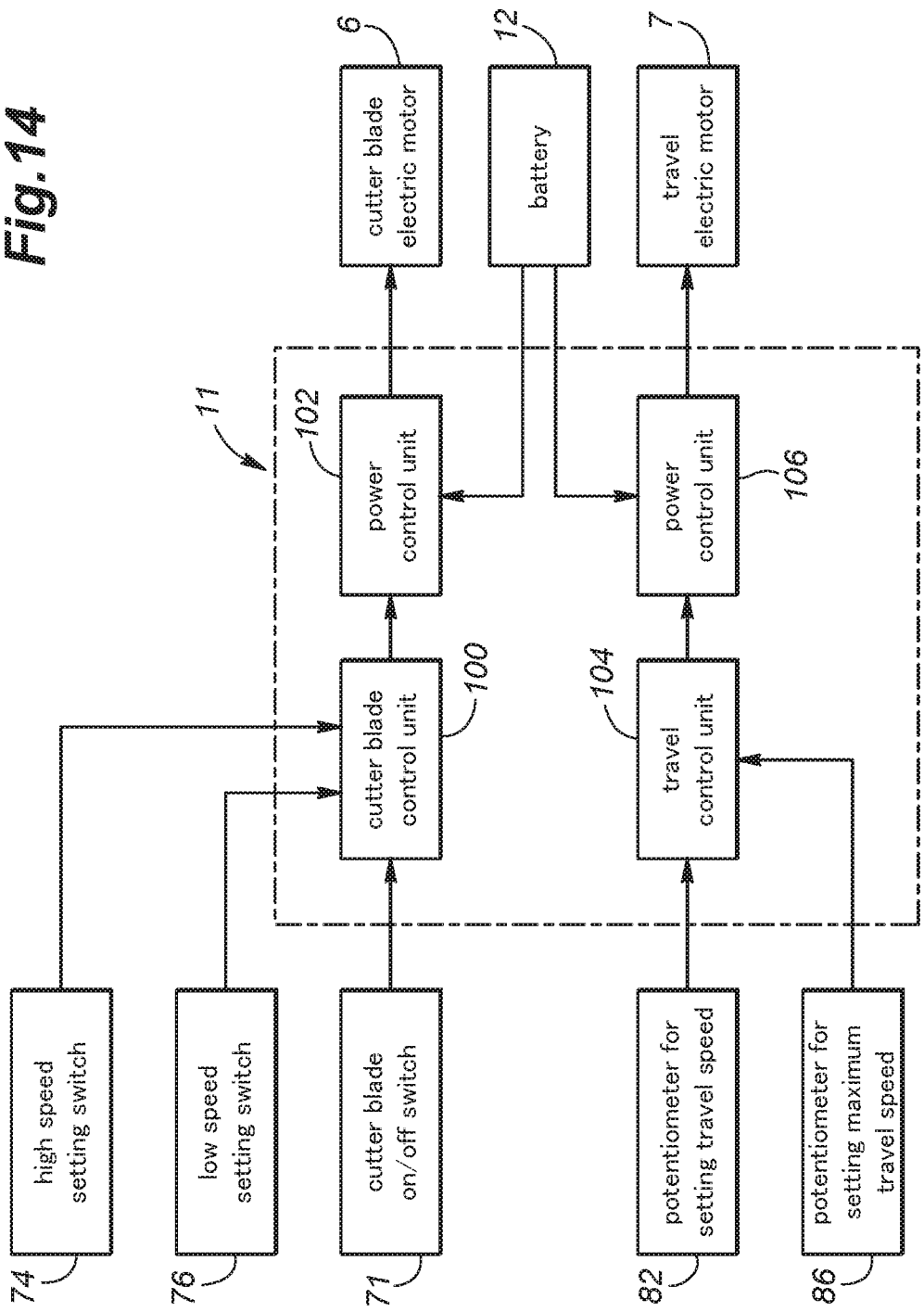
FIG. 14 is a block diagram showing an exemplary control system of the electric lawn mower.

The controller 11 is constituted of an electronic control unit (ECU) configured by a microcomputer, a ROM, a RAM, a peripheral circuit, an input/output interface, etc. As shown in FIG. 14, the controller 11 includes a cutter blade control unit 100 that conducts on/off control and rotational speed control of the cutter blade electric motor 6 based on the signals input from the cutter blade on/off switch 71, the high speed setting switch 74 and the low speed setting switch 76, and a power control unit 102 that controls the electric power supplied from the battery 12 to the cutter blade electric motor 6 by means of PWM control or the like based on the commands from the cutter blade control unit 100.

In addition, the controller 11 includes a travel control unit 104 that conducts on/off control and rotational speed control of the travel electric motor 7 based on the signals input from the potentiometers 82, 86, and a power control unit 106 that controls the electric power supplied from the battery 12 to the travel electric motor 7 by means of PWM control or the like based on the commands from the travel control unit 104.

Because all of the cutter blade on/off switch 71, the high speed setting switch 74, the low speed setting switch 76, and the potentiometers 82, 86 are concentratedly arranged in the electric box 30 at the laterally central position, routing of a wire harness or the like for connecting these component parts with the controller 11 can be achieved easily, and this facilitates assembly and maintenance work. In addition, such an arrangement can avoid increase in the profile of the pivoting ends of the cutter blade operation lever 50 and the travel operation lever 52. Therefore, a favorable design can be achieved and deterioration of operability of operation levers 50, 52 due to reduction in an operation space can be prevented.

Further, because the push buttons 78, 80 and the dial 88, which are operation elements for the high speed setting switch 74, the low speed setting switch 76 and the potentiometer 86 for setting the maximum travel speed, are also disposed at the laterally central position, the operator can access and operate these operation elements easily. Also, the arrangement of the operation elements at the central position can avoid increase in the profile of the pivoting ends of the operation levers 50 and 52.

In the electric lawn mower 1 having the above-described structure, when neither of the cutter blade operation lever 50 and the travel operation lever 52 is operated by the operator, the cutter blade operation lever 50 and the travel operation lever 52 are both at the off position due to the spring force exerted by the torsion coil springs 66, 68. Therefore, the cutter blade on/off switch 71 is in the off state, and the cutter blade electric motor 6 (and hence the cutter blade 3) is stopped. Further, the potentiometer 82 is at the zero position (outputs a travel stop command), and the travel electric motor 7 (and hence the electric lawn mower 1) is stopped.

When the central parts of the lever grip 50G of the cutter blade operation lever 50 and the lever grip 52G of the travel operation lever 52 are both grasped by the operator such that the cutter blade operation lever 50 and the travel operation lever 52 are tilted forward from the off position toward the on position against the spring force of the torsion coil springs 66, 68, the cutter blade on/off switch 71 is turned on to cause the cutter blade electric motor 6 to rotate at the maximum speed set by the high speed setting switch 74 and the low speed setting switch 76, which in turn causes the cutter blade 3 to rotate, while the potentiometer 82 outputs a travel command in accordance with the forward tilting angle of the travel operation lever 52 to cause the travel electric motor 7 to rotate at the rotational speed corresponding to the travel command, which in turn causes the electric lawn mower 1 to travel forward at the speed corresponding to the forward tilting angle of the travel operation lever 52. Thereby, the electric lawn mower 1 performs mowing while traveling forward. Once the travel operation lever 52 reaches the on position, the electric lawn mower 1 travels forward at the maximum speed set by the potentiometer 86.

Even during the forward travel, the maximum travel speed of the electric lawn mower 1 can be changed by turning the dial 88 of the potentiometer 86. Further, the rotational speed of the cutter blade 3 can be switched between the high speed and the low speed by selectively pressing the push button 78 or 80. Because the dial 88 and the push buttons 78, 80 are concentratedly arranged at the laterally central position below the lever grips 50G, 52G of the cutter blade operation lever 50 and the travel operation lever 52, even when grasping the cutter blade operation lever 50 and the travel operation lever 52 with one hand, the operator can easily operate the dial 88 and the push buttons 78, 80 with the other hand. Further, it is possible to select the rotational speed of the cutter blade 3 by operating the push buttons 78, 80 at the same time when starting the rotation of the cutter blade 3 by operating the cutter blade operation lever 50.

Moreover, because the upper surface 78A of the push button 78 of the high speed setting switch 74 has a larger width than the upper surface 80A of the push button 80 of the low speed setting switch 76, there is a difference in area between the upper surfaces 78A, 80A of the push buttons 78, 80. This enables the operator to visually distinguish the push button 78 of the high speed setting switch 74 and the push button 80 of the low speed setting switch 76 from each other easily and reliably.

When the travel operation lever 52 is released and returns to the off position, the travel electric motor 7 is stopped, and hence, the electric lawn mower 1 stops traveling. In this state, if the cutter blade operation lever 50 is at the on position, the cutter blade electric motor 6 drives the cutter blade 3 to rotate, whereby the mowing is performed while the electric lawn mower 1 is stationary.

Owing to the above-described interaction between the cutter blade operation lever 50 and the travel operation lever 52, it is prohibited to place only the travel operation lever 52 at the on position. Therefore, when the cutter blade 3 is not rotating, namely, when the mowing is not performed, the electric lawn mower 1 is not caused to travel by the travel electric motor 7. This reduces consumption of the electric power stored in the battery 12. It is to be noted that when the cutter blade 3 is not rotating, namely, when the mowing is not performed, the operator can move the electric lawn mower 1 by pushing it manually.

When an excessive external force in the rearward tilting direction is applied to the cutter blade operation lever 50 inadvertently, the engagement leg 50C gets out of the engagement recess 60, whereby the force transmitting engagement between the cutter blade operation lever 50 and the left rotary shaft 36 is released, and the cutter blade operation lever 50 is allowed to rotate beyond the off position in the rearward tilting direction relative to the left rotary shaft 36. Therefore, an excessive load is prevented from acting on the cutter blade operation lever 50 and/or the stopper surfaces 44A and 25A constituting the stopper mechanism (first stopper mechanism) determining the off position of the cutter blade operation lever 50.

Further, when an excessive external force in the rearward tilting direction is applied to the travel operation lever 52 inadvertently, the engagement legs 52C, 52D get out of the engagement recesses 70, 72, whereby the force transmitting engagement between the travel operation lever 52 and the right rotary shaft 38 is released, and the travel operation lever 52 is allowed to rotate beyond the off position in the rearward tilting direction relative to the right rotary shaft 38. Therefore, an excessive load is prevented from acting on the travel operation lever 52 and/or the stopper surfaces 46A, 48A, 25B, and 25C constituting the stopper mechanism (second stopper mechanism) determining the off position of the travel operation lever 52.

Owing to the above features, even if the operator inadvertently rotates the cutter blade operation lever 50 or the travel operation lever 52 rearward with an excessive force, deformation or damage to the operation levers 50, 52 as well as to the stopper mechanism that determines the off position can be avoided. Also, the stopper mechanism determining the off position and the operation levers 50, 52 are allowed to have a reduced strength, and therefore, they may be made more compact or thinner, and the degree of freedom of design of the operation levers 50, 52 can be improved, providing a sense of unity between the loop-shaped handle grip member 22 and the operation levers 50, 52 or making the operation levers 50, 52 comfort to grip.

When the cutter blade operation lever 50 and the travel operation lever 52 are tilted rearward beyond the off position, a reaction force against the operation of the operation levers 50, 52 is increased, causing a force required for operation to increase. This provides a braking effect, and enables the operator to note that the operation levers 50, 52 are tilted rearward beyond the off position, namely, beyond the normal rotation angle range.

Also, when the cutter blade operation lever 50 is tilted rearward beyond the off position, the engagement legs 50C, 50D need to ride over the inclined surfaces 60B, 62B, respectively. Thus, a detent mechanism is constituted, which provides a tactile feedback (click-like feel) to the operator when the cutter blade operation lever 50 is tilted rearward beyond the off position, to thereby enable the operator to note that the cutter blade operation lever 50 is tilted rearward beyond the off position, namely, beyond the normal rotation angle range.

When the travel operation lever 52 is tilted rearward beyond the off position, the engagement legs 52C, 52D need to get out of the engagement recesses 70, 72, respectively. Thus, a detent mechanism is constituted, which provides a tactile feedback (click-like feel) to the operator when the travel operation lever 52 is tilted rearward beyond the off position, to thereby enable the operator to note that the travel operation lever 52 is tilted rearward beyond the off position, namely, beyond the normal rotation angle range.

In the foregoing, the present invention has been described in terms of the preferred embodiment thereof, but it is obvious to a person skilled in the art that the present invention is not limited to the illustrated embodiment, and various alterations and modifications are possible without departing from the scope of the present invention.

Figure 15:
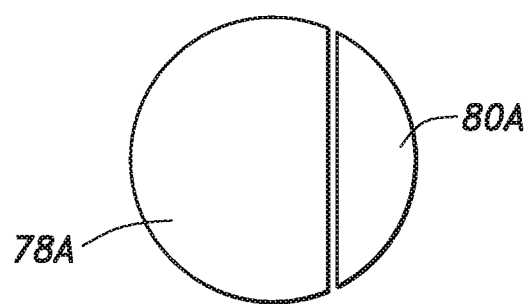
FIG. 15 is a schematic diagram showing another example of a push button upper surface of the electric lawn mower.
Figure 16:
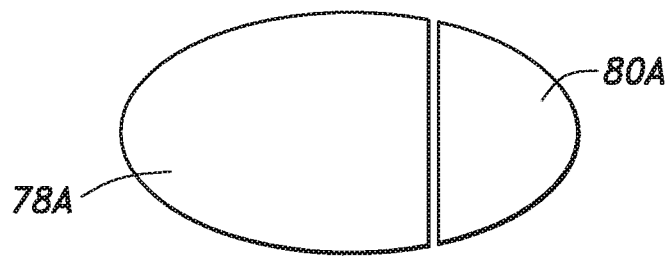
FIG. 16 is a schematic diagram showing a yet another example of the push button upper surface of the electric lawn mower.

For instance, the positions of the cutter blade operation lever 50 and the travel operation lever 52 may be changed such that they are disposed in front of the loop-shaped handle grip member 22, and the cutter blade operation lever 50 is disposed behind the travel operation lever 52. In this case, the cutter blade operation lever 50 and the travel operation lever 52 are rotated forward to be placed at the off position, and rotated rearward to be placed at the on position. It is also possible to exchange the functions of the cutter blade operation lever 50 and the travel operation lever 52 with each other. Further, the shape of the upper surfaces 78A, 80A of the push buttons 78, 80 is not limited to a rectangular shape. As shown in FIGS. 15 and 16, the upper surfaces 78A, 80A may jointly form a circular surface or an elliptical surface, such that the upper surface 78A constitutes a larger part of the circular surface or the elliptical surface than the upper surface 80A. The number of the switches for setting the rotational speed of the cutter blade 3 is not limited to two but may be more than two.

The electric power equipment of the present invention is not limited to electric lawn mowers, but may be embodied as electric snow blowers, electric tillers, and the like.

Also, not all of the structural elements of the embodiment described above are necessarily indispensable, and they may be selectively used as appropriate without departing from the spirit of the present invention.

The invention claimed is:

1. Electric power equipment, comprising:
   a main body;
   a work unit and wheels provided to the main body;
   a work unit electric motor mounted on the main body to drive the work unit;
   a travel electric motor mounted on the main body to drive the wheels;
   a handle including a pair of left and right side rod members extending rearward from the main body;
   a first rotary shaft supported at a rear end of one of the side rod members so as to be rotatable about a horizontal axis;
   a second rotary shaft supported at a rear end of the other of the side rod members so as to be rotatable about a horizontal axis aligned with the horizontal axis about which the first rotary shaft is rotatable;
   a lever support collar member fitted on an outer circumference of the first rotary shaft so as to be rotatable around the first rotary shaft;
   a first operation lever having one end connected with an outer end of the first rotary shaft in a force transmitting relationship and another end connected with an outer end of the second rotary shaft so as to be rotatable relative to the second rotary shaft about a central axis of the second rotary shaft;
   a second operation lever having one end connected with the lever support collar member at a position displaced relative to a central axis of the first rotary shaft so as to be rotatable with the lever support collar member and another end connected with the outer end of the second rotary shaft at a position displaced relative to the central axis of the second rotary shaft in a force transmitting relationship;
   a first motor drive command unit disposed at a laterally central position between the rear ends of the side rod members so as to be operable by an inner end of the first rotary shaft to generate a command signal for controlling driving of one of the work unit electric motor and the travel electric motor;
   a second motor drive command unit disposed at a laterally central position between the rear ends of the side rod members so as to be operable by an inner end of the second rotary shaft to generate a command signal for controlling driving of the other of the work unit electric motor and the travel electric motor; and
   a controller configured to control electric power supplied from a power source to the work unit electric motor and the travel electric motor based on the signals from the first motor drive command unit and the second motor drive command unit.

2. The electric power equipment according to claim 1, wherein:
   the handle includes a laterally extending handle grip to be held by an operator, and each of the first operation lever and the second operation lever includes a laterally extending lever grip, each lever grip being pivotable between an on position where the lever grip is positioned in the vicinity of the handle grip and an off position at which the lever grip is positioned more distant from the handle grip than at the on position, and being urged by a spring toward the off position;
   the first motor drive command unit generates a command signal to stop a corresponding one of the electric motors when the first operation lever is at the off position, and generates a command signal to drive the corresponding electric motor when the first operation lever is at the on position;
   the second motor drive command unit generates a command signal to stop a corresponding one of the electric motors when the second operation lever is at the off position, and generates a command signal to drive the corresponding electric motor when the second operation lever is at the on position; and
   one of the first operation lever and the second operation lever that corresponds to the work unit electric motor is configured to engage the other of the first operation lever and the second operation lever that corresponds to the travel electric motor during a pivoting movement to the off position, and the other of the first operation lever and the second operation lever is configured to engage the one of the first operation lever and the second operation lever during a pivoting movement to the on position.

3. The electric power equipment according to claim 1, further comprising an upper speed limit setting potentiometer for variably setting an upper limit of a travel speed of the electric power equipment and an operation element of the potentiometer, the potentiometer and the operation element thereof being located at a laterally central position between the rear ends of the side rod members.

4. The electric power equipment according to claim 1, further comprising an upper speed limit selector switch for selectively setting an upper limit rotational speed of the work unit electric motor and an operation element of the selector switch, the selector switch and the operation element thereof being located at a laterally central position between the rear ends of the side rod members.

5. The electric power equipment according to claim 1, wherein the first operation lever and the second operation lever include respective laterally extending parts configured to be grasped by an operator simultaneously, and the first operation lever includes a part configured to allow the operator to grasp only the first operation lever.

6. The electric power equipment according to claim 5, wherein the first operation lever and the second operation lever have mutually different shapes as seen in front view.

7. The electric power equipment according to claim 1, wherein the work unit includes a cutter blade for mowing.

* * * * *